J. H. GLAUBER, DEC'D.
THE CITIZENS SAVINGS & TRUST COMPANY, EXECUTOR.
PACKING MEMBER FOR SERVICE CLAMPS.
APPLICATION FILED MAY 5, 1913.

1,191,887.

Patented July 18, 1916.

ATTEST

INVENTOR
Joseph H. Glauber
BY
ATTYS.

UNITED STATES PATENT OFFICE.

JOSEPH H. GLAUBER, OF CLEVELAND, OHIO; THE CITIZENS SAVINGS & TRUST COMPANY EXECUTOR OF SAID GLAUBER, DECEASED.

PACKING MEMBER FOR SERVICE-CLAMPS.

1,191,887.  Specification of Letters Patent.  Patented July 18, 1916.

Application filed May 5, 1913. Serial No. 765,566.

*To all whom it may concern:*

Be it known that I, JOSEPH H. GLAUBER, citizen of the United States, residing at Cleveland, in the county of Cuyahoga and State of Ohio, have invented certain new and useful Improvements in Packing Members for Service-Clamps, of which the following is a specification.

The invention comprises a packing member for service clamps, substantially as herein shown and described and more particularly pointed out in the claims.

In tapping a thin water pipe to provide a water connection the general practice is to employ a clamp comprising a yoke or strap to engage the pipe and a saddle with an opening through which the pipe is drilled. A piece of soft metal is also generally used as a gasket about such opening, the same being placed between the saddle and the pipe. This work is carried on in the trench, often under difficulties, and the clamp must be shifted and fixed to meet different conditions. It will also be understood that the tapping operation usually takes place in pipes filled with water under pressure.

My object is to provide a packing member of greater utility and effectiveness than the packing devices ordinarily employed by using a solid disk of soft metal having concentric ribs on its opposite sides and a pair of perforated extensions. A member of this kind, when attached to the yoke or strap, can not possibly be displaced from its central seating relation with the saddle, thereby greatly facilitating attachment proceedings in the trench and assuring perfect sealing engagement between the pipe and saddle prior to tapping operations. The three elements comprising the yoke, saddle and packing member may also be shipped and handled with great convenience when assembled and secured together. Saddles of the same size may differ in the size of their central openings, but my improved ribbed disk provides an extended sealing surface whereby a multiplicity of serried contacts may be made with the pipe and saddle to assure an effective seal for connections of different sizes.

Figure 1:
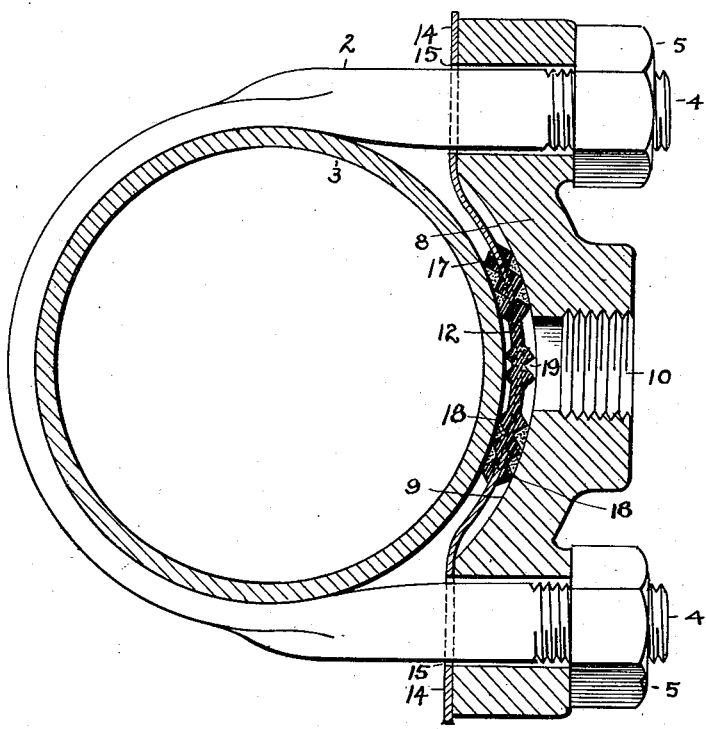
Figure 2:
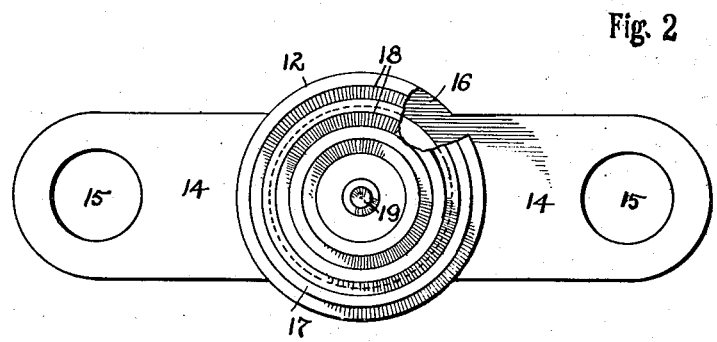
Figure 3:
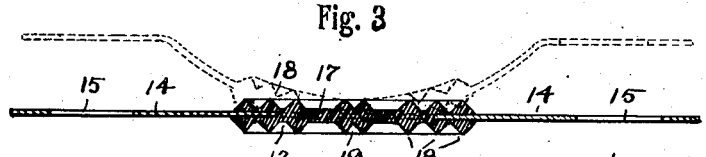

In the accompanying drawings, Figure 1 is a sectional view of a service clamp with my improved packing member in clamping relations with a pipe but not compressed thereon. Fig. 2 is a plan elevation of the packing member, and Fig. 3 is a sectional view longitudinally thereof, the dotted lines showing it in bent form.

As shown, the yoke 2 comprises a strap adapted to encircle a pipe 3, the ends 4 thereof being threaded for nuts 5 to fasten the saddle 6 in place. The saddle has a pair of openings 7 through which the ends 4 project, and the middle portion 8 of the saddle is curved or has a curved flat face 9 to correspond to the curvature of pipe 3. A central opening 10 is provided for saddle 6 and this is partly screw-threaded to receive the final water connection. Drilling of the pipe is also through this opening but before this proceeding occurs, a water-tight joint is obtained by compressing the packing member 12 in place between the curved saddle face 9 and the pipe 3. This packing member is fixed in definite relations to the saddle 6 by thin flexible extensions 14 having openings 15 to slip over the strap ends 4, but is not attached to the saddle in any way. The extensions 14 are preferably integral with one another, being united by a ring-shaped middle portion 16, see Fig. 2 where broken away. This central part is entirely covered on both sides by lead or other soft metal in the form of a disk 17 having a ribbed surface on both sides, the ribs 18 being arranged in concentric circles and each rib being preferably of V-shape in cross section. The middle portion of the disk 17 is preferably provided with a central pocket or hole 19 which is of utility in locating the sealing member centrally in respect to the opening in the saddle, and also in centering any suitable tapping or boring tool in making the opening in the pipe 3. Neither the pipe 3 or packing member 12 is shown in the drawing as thus pierced or opened, a result which obviously does not occur until after the service clamp is fastened upon the pipe and the member 12 compressed. In this latter operation, disk 17 as a whole conforms to the curvature of the pipe and the saddle, and the sharp edges of the soft ribs 18 are embedded in the rough and irregular surface depressions of the pipe. It follows therefore that sealing engagement is definitely assured in concentric circles about opening 10.

A further conception of the invention is embodied in the series of annular grooves between the ribs 18. Thus where conditions are such that a cement union is desired, the annular grooves on either or both sides of the disk may be filled with a cement or compound. Such material is applied before the disk is placed upon the pipe, and the face of the disk then affords contacting surfaces of different materials alternately in concentric circles. Fig. 1 illustrates this conception.

Member 12 may be used for saddles of different sizes and shapes and for tap openings 10 of different sizes and still provide an effective seal. The number of ribs 18 may be increased, especially in larger sizes of such packing members, and the piece of metal forming the extensions 14 is preferably of greater tensile strength than the disk 17 affixed thereto so that it cannot be easily displaced or torn from its connection with the ends 4 of the yoke or strap 2, especially in shipping the device in assembled relations and in applying the parts to a pipe.

What I claim is:

1. A packing member for service clamps, comprising a solid disk of soft metal having concentric ribs and a pair of opposite extensions therewith of a different metal from said disk.

2. A packing member for service clamps, comprising a disk of soft metal having concentric ribs in its opposite sides and a centering guide at its middle and provided with lateral extensions at its edges having holes.

In testimony whereof I affix my signature in presence of two witnesses.

JOSEPH H. GLAUBER.

Witnesses:
F. C. MUSSUN,
E. M. FISHER.